(12) United States Patent
Lee

(10) Patent No.: US 8,072,477 B2
(45) Date of Patent: Dec. 6, 2011

(54) IMAGE FORMING APPARATUS AND SIGNAL SYNCHRONIZING METHOD THEREOF

(75) Inventor: Kwon-cheol Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 904 days.

(21) Appl. No.: 11/839,847

(22) Filed: Aug. 16, 2007

(65) Prior Publication Data

US 2008/0174653 A1 Jul. 24, 2008

(30) Foreign Application Priority Data

Jan. 23, 2007 (KR) ........................ 10-2007-0007165

(51) Int. Cl.
*B41J 2/435* (2006.01)
*B41J 2/47* (2006.01)
(52) U.S. Cl. ........................ 347/235; 347/250
(58) Field of Classification Search .................. 347/116, 347/229, 234–235, 237, 247–250
See application file for complete search history.

(56) References Cited

U.S. PATENT DOCUMENTS

| | | | | |
|---|---|---|---|---|
| 4,393,387 A | * | 7/1983 | Kitamura | 347/240 |
| 4,467,334 A | * | 8/1984 | Anzai | 347/118 |
| 4,788,560 A | * | 11/1988 | Miura | 347/236 |
| 6,646,668 B2 | | 11/2003 | Tanimoto et al. | |
| 2006/0017984 A1 | * | 1/2006 | Lee | 358/412 |

FOREIGN PATENT DOCUMENTS

| | | |
|---|---|---|
| EP | 0 503 643 A2 | 9/1992 |
| JP | 63-261275 | 10/1988 |
| JP | 8-164632 | 6/1996 |
| JP | 2003-107377 | 4/2003 |
| JP | 2006-159560 | 6/2006 |
| JP | 2006159560 A * | 6/2006 |
| KR | 2004-71041 | 8/2004 |
| KR | 2005-107154 | 11/2005 |

OTHER PUBLICATIONS

Search Report issued by European Patent Office on May 8, 2008 in European Patent Application No. 08100766.8.

* cited by examiner

*Primary Examiner* — Hai C Pham
(74) *Attorney, Agent, or Firm* — Staas & Halsey LLP

(57) ABSTRACT

An image forming apparatus includes: a plurality of optical scanning parts that scan a photoconductor with light of plural colors to form an electrostatic latent image on the photoconductor based on print data; and a controller that, based on a first optical scanning part to which a horizontal synchronization signal is applied of the optical scanning parts, calculates an offset value for light-scan of a second optical scanning part of the optical scanning parts, and controls the optical scanning parts to scan the photoconductor with the light according to the calculated offset value.

18 Claims, 4 Drawing Sheets

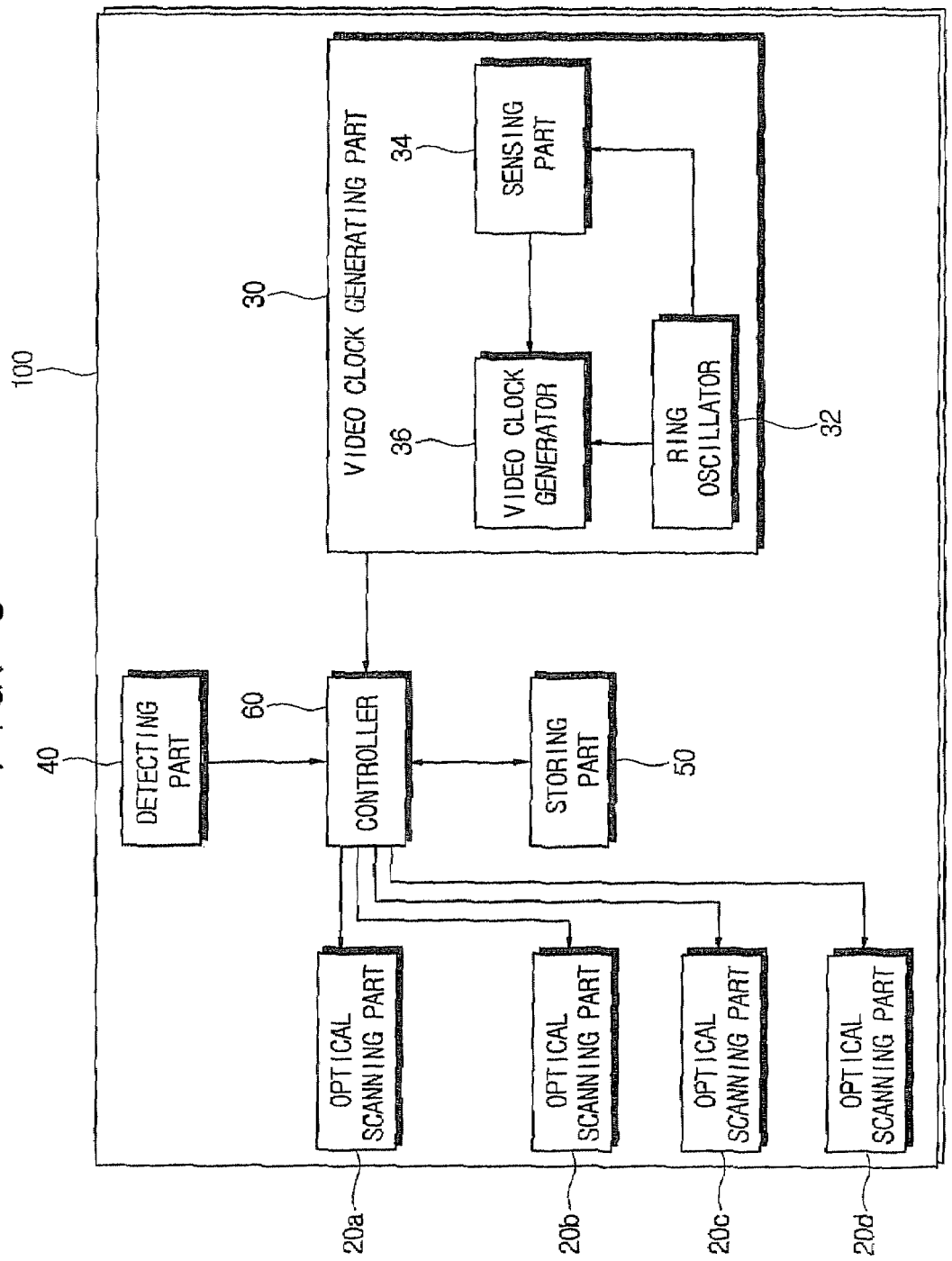

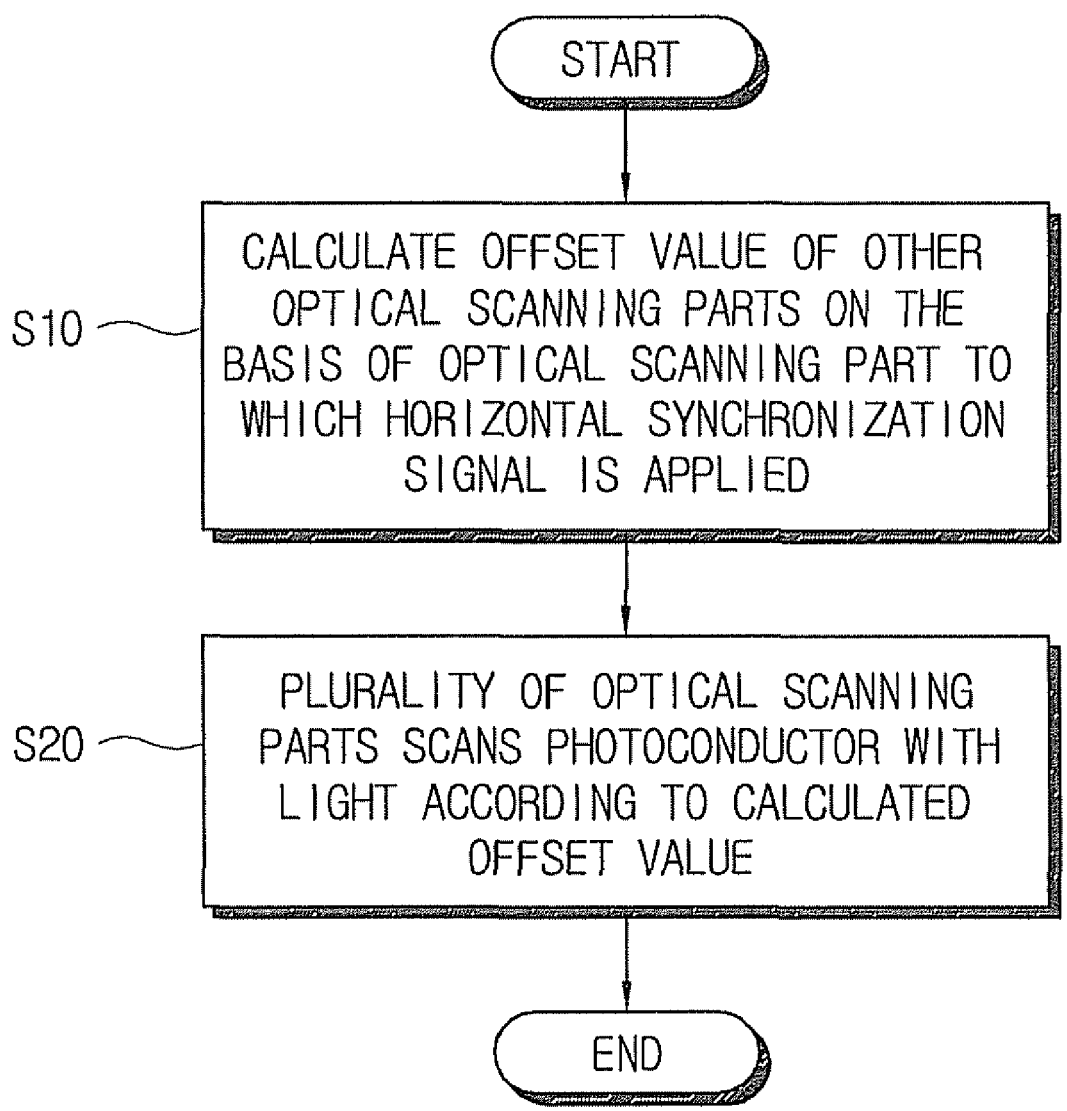

IMAGE FORMING APPARATUS AND SIGNAL SYNCHRONIZING METHOD THEREOF

CROSS-REFERENCE TO RELATED APPLICATIONS

This application claims the benefit of Korean Patent Application No. 2007-7165, filed on Jan. 23, 2007 in the Korean Intellectual Property Office, the disclosure of which is incorporated herein by reference.

BACKGROUND OF THE INVENTION

1. Field of the Invention

An aspect of the present invention relates to an image forming apparatus and a signal synchronizing method thereof, and more particularly, to an image forming apparatus having a plurality of optical scanning parts for scanning a photoconductor with light, and a signal synchronizing method thereof.

2. Description of the Related Art

An image forming apparatus forms a print image through various systems such as an inkjet system, an electrophotographic system or other systems known in the art. Of these systems, an image forming apparatus that employs the electrophotographic system forms an image on a recording medium through a paper feeder, an image forming part, a fixer, a paper discharger and so on.

Conventional image forming apparatuses form an electrostatic latent image on a photoconductor when an optical scanning part scans the photoconductor with light. Of the conventional image forming apparatuses, an image forming apparatus that is capable of forming an image with plural colors includes a plurality of optical scanning parts corresponding to the plural colors, each of which scans a photoconductor with light based on horizontal synchronization signals and video clock signals according to print data.

Such an image forming apparatus that is capable of forming the image with the plural colors corrects optical scanning points of different optical scanning parts based on a particular optical scanning part among the plurality of optical scanning parts. This is done in order to alleviate deviations in assembly process of the respective optical scanning parts. Thus, the plurality of optical scanning parts share one polygon mirror and scan the photoconductor with light according to the corrected optical scanning points based on horizontal synchronization signals applied to the corresponding optical scanning parts.

When the conventional image forming apparatus synchronizes video clocks and scans the photoconductors with light, if at a point of time when a horizontal synchronization signal is applied to one optical scanning part falls within non-image intervals, that is, not effective image intervals, of different optical scanning parts, it is possible to scan the photoconductor with light according to the corrected optical scanning points of time.

However, as shown in FIG. 1, if a first horizontal synchronization signal is applied in an effective image interval according to a second video clock, that is, if a horizontal synchronization signal is applied to an optical scanning part in an effective image interval in which another optical scanning part scans a photoconductor with light corresponding to an effective image, the effective image may not be correctly formed since a frequency is varied in order to re-align a direction in which the effective image is formed, as indicated by A in FIG. 1.

SUMMARY OF THE INVENTION

Accordingly, it is an aspect of the present invention to provide an image forming apparatus which is capable of determining an offset value of an optical scanning part on the basis of a horizontal synchronization signal applied to a different optical scanning part, so that quality of a print image can be maintained even while only one horizontal synchronization signal is detected irrespective of a relative position relationship between the optical scanning parts, and a signal synchronizing method thereof.

Additional aspects and/or advantages of the present invention will be set forth in part in the description which follows and, in part, will be obvious from the description, or may be learned by practice of the present invention The foregoing and/or other aspects of the present invention can be achieved by providing an image forming apparatus including: a plurality of optical scanning parts that scan a photoconductor with light of plural colors to form an electrostatic latent image on the photoconductor based on print data; and a controller that, on the basis of a first optical scanning part to which a horizontal synchronization signal is applied of the optical scanning parts, calculates an offset value for light-scan of a second optical scanning part of the optical scanning parts, and controls the optical scanning parts to scan the photoconductor with the light according to the calculated offset value.

According to another aspect of the invention, the image forming apparatus further comprises a video clock generating part that generates a video clock for forming the electrostatic latent image on the photoconductor, wherein the controller controls the video clock generating part to generate the video clock corresponding to the second optical scanning part according to the calculated offset value.

According to another aspect of the invention, the image forming apparatus further comprises a detecting part which detects whether the horizontal synchronization signal is applied corresponding to the first optical scanning part.

According to another aspect of the invention, the controller controls the optical scanning parts to scan the photoconductor with the light according to the calculated offset value if the horizontal synchronization signal corresponding to the first optical scanning part is applied in an effective image interval in which the second optical scanning part scans the photoconductor with the light.

According to another aspect of the invention, the image forming apparatus further comprises a storing part, wherein the controller stores the offset value in the storing part.

According to another aspect of the present invention, there is provided a signal synchronizing method of an image forming apparatus including a photoconductor on which an electrostatic latent image is formed based on print data, and a plurality of optical scanning parts that scans the photoconductor with light of plural colors, the method including: calculating, on the basis of a first optical scanning part to which a horizontal synchronization signal is applied of the optical scanning parts, an offset value for light-scan of a second optical scanning part of the optical scanning parts; and scanning, by the plurality of optical scanning part, the photoconductor with the light according to the calculated offset value.

According to another aspect of the invention, the calculating of the offset value comprises generating a video clock corresponding to the second optical scanning part according to the calculated offset value.

According to another aspect of the invention, the calculating of the offset value comprises detecting whether the horizontal synchronization signal is applied corresponding to the first optical scanning part.

According to an aspect of the invention, the calculating of the offset value comprises calculating the offset value if the horizontal synchronization signal corresponding to the first optical scanning part is applied in an effective image interval in which the second optical scanning part scans the photoconductor with the light.

According to an aspect of the invention, the calculating the offset value comprises storing the offset value.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a block diagram showing the configuration of the image forming apparatus shown in FIG. 2; and FIG. 4 is a flow chart illustrating a signal synchronizing method of the image forming apparatus shown in FIG. 2.

DETAILED DESCRIPTION OF THE EMBODIMENTS

Figure 1:
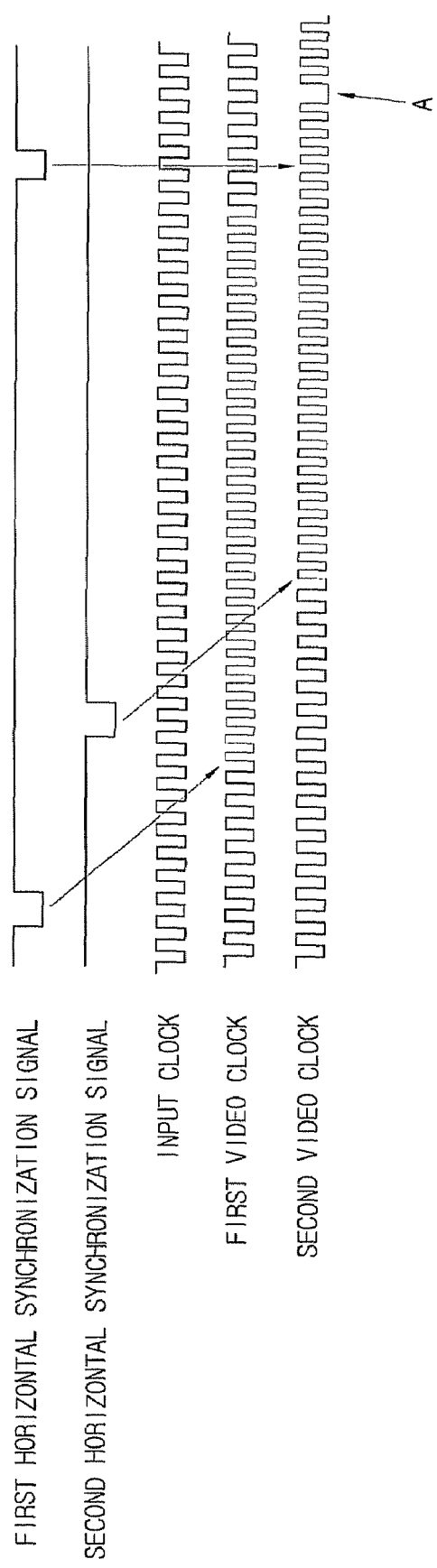
FIG. 1 is a view showing a procedure of synchronizing video clocks in a conventional image forming apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
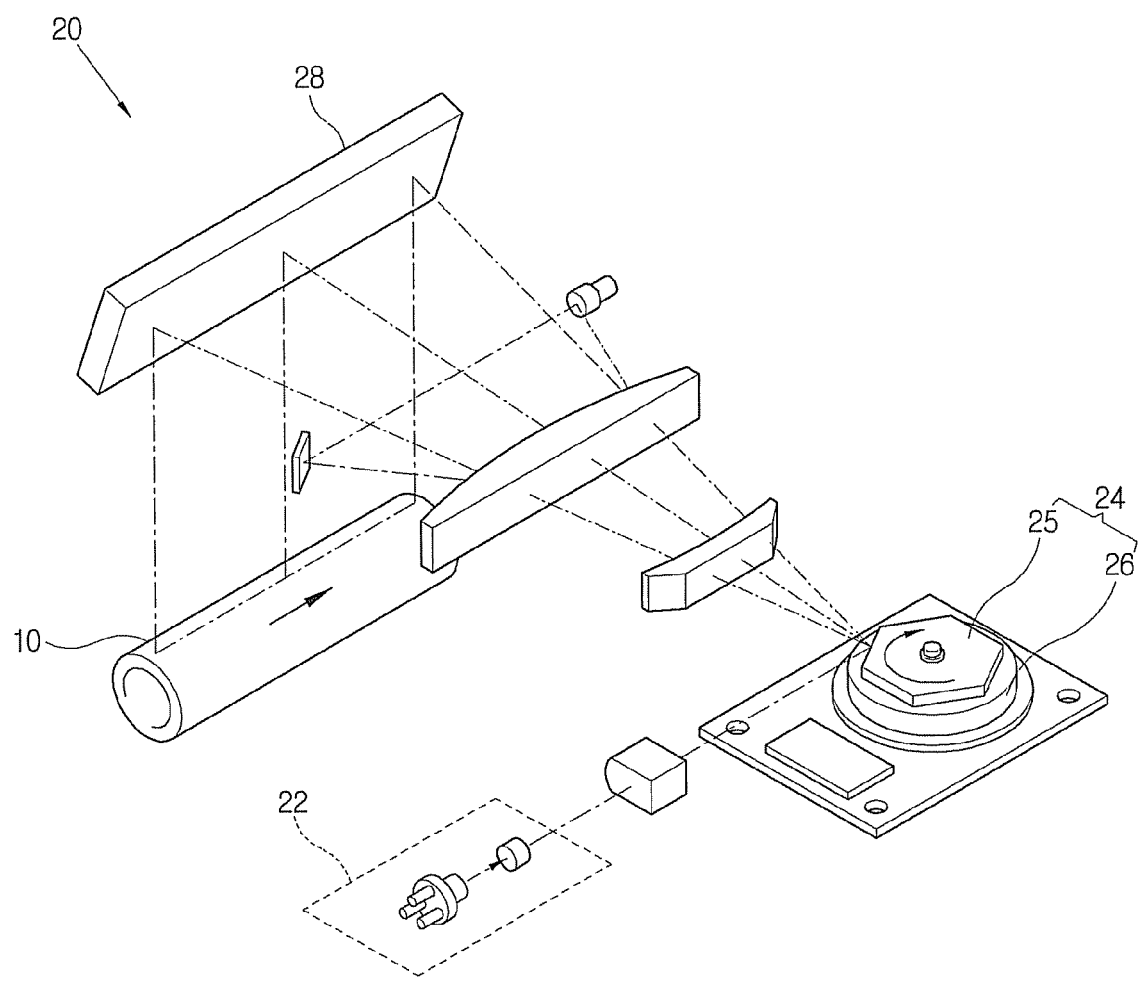
FIG. 2 is an exploded perspective view showing a configuration of an image forming apparatus according to an exemplary embodiment of the present invention.

FIG. 2 is an exploded perspective view showing a configuration of an image forming apparatus 100 according to an exemplary embodiment of the present invention, and FIG. 3 is a block diagram showing the configuration of the image forming apparatus 100 according to the exemplary embodiment of the present invention. As shown in FIGS. 2 and 3, the image forming apparatus 100 includes a photoconductor 10, an optical scanning part 20, a video clock generating part 30, a sensing part 40, a storing part 50 and a controller 60. In this embodiment, the image forming apparatus 100 may include a color printer which is capable of forming a print image with plural colors.

An electrostatic latent image is formed on the photoconductor 10 while the photoconductor is rotated. Specifically, when a charging roller (not shown) charges a surface of the photoconductor 10 to negative charges, the optical scanning part 20 forms the electrostatic latent image on the photoconductor 10 by scanning the photoconductor 10 with light. A developing roller (not shown) applies a developer selectively on only the electrostatic latent image formed on the photoconductor 10, and a transfer roller (not shown) transfers the developer applied on the photoconductor 10 into a recording medium that passes between the photoconductor 10 and a transfer roller (not shown).

The optical scanning part 20 scans the photoconductor 10 with light of plural colors. In this embodiment, the optical scanning part 20 includes a light source module 22, a polygon mirror assembly 24 and a reflecting mirror 28 and forms the electrostatic latent image on the photoconductor 10 by scanning the photoconductor 10 with the light carrying print image information.

The light source module 22 generates and emits light. The polygon mirror assembly 24 includes a polygon mirror 25 having a plurality of reflecting planes and a driving part 26 that rotates the polygon mirror 25 at a high uniform speed, and reflects the light emitted from the light source module 22 in such a manner that the surface of the photoconductor 10 is scanned with the reflected light. In this embodiment, many optical scanning parts 20 may be provided. A plurality of optical scanning parts 20a, 20b, 20c and 20d share one polygon mirror 25 in forming the electrostatic latent image on the photoconductor 10.

The reflecting mirror 28 directs the light reflected by the polygon mirror 25 to the photoconductor 10.

In this embodiment, the optical scanning part 20 may include a laser scanning unit (LSU) that scans the photoconductor 10 with light according to colors corresponding to CYMK (cyan, magenta, yellow and black).

The video clock generating part 30 generates a video clock to cause the optical scanning part 20 to form the electrostatic latent image on the photoconductor 10, based on print data and includes a ring oscillator 32, a sensing part 34 and a video clock generator 36.

The ring oscillator 32 generates an oscillation frequency, and the sensing part 34 detects the number of pulses oscillated within one cycle of a system clock by the oscillation frequency generated by the ring oscillator 32 and transmits a control signal which controls the generation of the video clock.

The video clock generator 36 generates the video clock for forming the electrostatic latent image on the photoconductor 10, based on the control signal transmitted from the sensing part 34.

The detecting part 40 is provided on a light traveling path of a first optical scanning part 20a and detects a horizontal synchronization signal of the first optical scanning part 20a. The detecting part 40 may include a sensor. In this embodiment, since the image forming apparatus 100 synchronizes video clocks to cause at least one of second optical scanning parts 20b, 20c and 20d to form electrostatic latent images on the photoconductor, based on the horizontal synchronization signal of the first optical scanning part 20a, there is no need for more detecting parts to detect horizontal synchronization signals corresponding to at least one of the second optical scanning parts 20b, 20c and 20d. That is, the number of detecting parts 40 may be smaller than the number of optical scanning parts 20.

The storing part 50 stores offset values for light-scan of at least one of the second optical parts 20b, 20c and 20d on the basis of the first optical scanning part 20a to which the horizontal synchronization signal is applied. In this embodiment, the storing part 50 may include a CRUM (Customer Replacement Unit Monitor) or others known in the art.

The controller 60 calculates at least one of the offset values for the light-scan of at least one of the second optical scanning parts 20b, 20c and 20d on the basis of the first optical scanning part 20a to which the horizontal synchronization signal is applied, and controls the plurality of optical scanning parts 20 to emit light according to the calculated offset values.

In this embodiment, at least one of the offset values required for at least one of the second optical scanning parts 20b, 20c and 20d to emit the light may be calculated by an ACR (Auto Color Registration). Here, the ACR refers to detecting a color registration mark formed on a transport belt (not shown) with a sensor and precisely setting points of time of the light-scan of the optical scanning parts 20 according to a method of determining parameters based on the detected color registration mark.

In the image forming apparatus in which the horizontal synchronization signals are applied to the optical scanning parts 20, respectively, when at least one of the second optical scanning parts 20b, 20c and 20d emit light in an effective image interval, if a reference horizontal synchronization signal corresponding to the first optical scanning part 20a is applied, a frequency to re-align a direction in which an image is formed is varied, which may result in errors in synchronization offset calculation of the corresponding second optical scanning parts 20b, 20c and 20d.

Accordingly, the controller 60 detects only the horizontal synchronization signal corresponding to the first optical scanning part 20a irrespective of the horizontal synchronization signals corresponding to the second optical scanning parts 20b, 20c and 20d and calculates at least one of the offset values required to synchronize at least one of the second optical scanning parts 20b, 20c and 20d on the basis of the first optical scanning part 20a, thereby preventing the reference horizontal synchronization signal corresponding to the first optical scanning part 20a from being applied in the effective image intervals of the second optical scanning parts 20b, 20c and 20d.

Of course, in addition to calculating the offset values required to synchronize the second optical scanning parts 20b, 20c and 20d on the basis of the horizontal synchronization signal corresponding to the first optical scanning part 20a, the controller 60 may calculate offset values required to synchronize the remaining optical scanning parts on the basis of a horizontal synchronization signal corresponding to one of the second optical scanning parts 20b, 20c and 20d. That is, an electrostatic latent image may be formed on the photoconductor 10 on the basis of a horizontal synchronization signal corresponding to any one of the plurality of optical scanning parts 20.

In addition, the controller 60 controls the video clock generating part 30 to generate video clocks corresponding to the second optical scanning parts 20b, 20c and 20c according to the calculated offset values.

Thus, the image forming apparatus 100 can maintain quality of a print image even with use of only one horizontal synchronization signal and reduce the number of detecting parts 40 to detect the horizontal synchronization signal since only one horizontal synchronization signal is used.

Hereinafter, a signal synchronizing method of the image forming apparatus 100 according to the exemplary embodiment of the present invention will be described with reference to FIG. 4.

First, the controller 60 calculates at least one of the offset values for the light-scan of at least one of the second optical scanning parts 20b, 20c and 20d on the basis of the first optical scanning part 20a to which the horizontal synchronization signal is applied at operation S10. In addition, the controller may generate the video clocks corresponding to the second optical scanning parts 20b, 20c and 20d according to the offset values calculated in the operation S10.

In addition, at operation S10, the controller 60 may detect only the horizontal synchronization signal corresponding to the first optical scanning part 20a and control the second optical scanning parts 20b, 20c and 20d to scan the photoconductor with light according to the offset values calculated for the detected horizontal synchronization signal.

Next, at operation S20, the plurality of optical scanning parts 20 scans the photoconductor with light according to the offset values calculated in the operation S10.

Thus, quality of a print image can be maintained even with use of only one horizontal synchronization signal and the number of detecting parts 40 to detect the horizontal synchronization signal can be reduced since only one horizontal synchronization signal is used.

As is apparent from the above description, an aspect of the present invention provides an image forming apparatus which is capable of maintaining quality of a print image even with use of only one horizontal synchronization signal and reducing the number of detecting parts needed to detect the horizontal synchronization signal since only one horizontal synchronization signal is used, and a signal synchronizing method thereof.

In addition, since there is no need to perform the calculation for synchronization of the respective optical scanning parts, time taken for image formation can be reduced.

Meanwhile, the method of an aspect of the present invention can be achieved in the form of codes/instructions/software program, which can be performed in a computer, and can be realized in a general-purpose digital computer, which operates the codes/instructions/program using a recording medium readable by the computer.

The computer-readable recording medium includes a storage medium such as a magnetic storing medium (for example, a ROM, a floppy disk, and a hard disk), an optical read-out medium (for example, a CD-ROM, DVD), and a carrier wave (for example, transmission through internet). In addition, the embodiments of the present invention can be realized as media including computer readable codes, and thus, a plurality of computer systems connected to each other by a network can separately process. The programs, codes, and code segments realizing the embodiments of the present invention can be construed easily by programmers in the art.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image forming apparatus comprising:
a plurality of optical scanning parts that scan a photoconductor with light of plurality of colors to form an electrostatic latent image on the photoconductor based on print data and correspond to the plurality of colors respectively;
a controller that, based on a horizontal synchronization signal being applied to any one of the plurality of optical scanning parts, calculates an offset value for a light-scan of an other optical scanning part of the plurality of optical scanning parts, and controls the other of the plurality of the optical scanning parts to scan the photoconductor with the light according to the calculated offset value,
wherein the controller controls the optical scanning parts to scan the photoconductor with the light according to the calculated offset value if the horizontal synchronization signal corresponding to the any one optical scanning part is applied in an effective image interval in which the other optical scanning part scans the photoconductor with the light.

2. The image forming apparatus according to claim 1, further comprising a video clock generating part that generates a video clock for forming the electrostatic latent image on the photoconductor, wherein the controller controls the video clock generating part to generate the video clock corresponding to the other optical scanning part according to the calculated offset value.

3. The image forming apparatus according to claim 1, further comprising a detecting part which detects whether the horizontal synchronization signal is applied to the any one optical scanning part.

4. The image forming apparatus of claim 3, wherein a number of detecting parts is smaller than a number of optical scanning parts.

5. The image forming apparatus according to claim 1, further comprising a storing part,
wherein the controller stores the calculated offset value in the storing part.

6. The image forming apparatus according to claim 1, further comprising a video clock generating part to generate a video clock to cause the optical scanning parts to form the electrostatic latent image on the photoconductor, based on the print data.

7. The image forming apparatus of claim 6, wherein the video clock generating part includes a ring oscillator, a detecting part, and a video clock generator.

8. The image forming apparatus of claim 7, wherein the ring oscillator generates an oscillation frequency, and the detecting part detects a number of pulses oscillated within one cycle of a system clock by the oscillation frequency generated by the ring oscillator and transmits a control signal that controls the generation of the video clock.

9. The image forming apparatus of claim 8, wherein the video clock generator generates the video clock for forming the electrostatic latent image on the photoconductor, based on the control signal transmitted from the detecting part.

10. A signal synchronizing method of an image forming apparatus including a photoconductor on which an electrostatic latent image is formed based on print data, and a plurality of optical scanning parts that scan the photoconductor with light of a plurality of colors and correspond to the plurality of colors respectively, comprising:
calculating, based on a horizontal synchronization signal being applied to any one of the plurality of optical scanning parts, an offset value for a light-scan of an other optical scanning part of the plurality of optical scanning parts; and
scanning, the photoconductor with the plurality of optical scanning parts with the light according to the calculated offset value,
wherein the calculating of the offset value comprises calculating the offset value if the horizontal synchronization signal corresponding to the any one optical scanning part is applied in an effective image interval in which the other optical scanning parts scans the photoconductor with the light.

11. The signal synchronizing method according to claim 10, wherein the calculating the offset value comprises generating a video clock corresponding to the other optical scanning part according to the calculated offset value.

12. The signal synchronizing method according to claim 10, wherein the calculating the offset value comprises detecting whether the horizontal synchronization signal is applied to the any one optical scanning part.

13. The signal synchronizing method according to claim 10, wherein the calculating the offset value comprises storing the calculated offset value.

14. The signal synchronizing method according to claim 10, wherein the offset value is calculated by an auto color registration.

15. A signal synchronizing method of an image forming apparatus including a photoconductor on which an electrostatic latent image is formed based on print data, and a plurality of optical scanning parts that scan the photoconductor with light of a plurality of colors and correspond to the plurality of colors respectively, comprising:
applying only one horizontal synchronization signal to any one optical scanning part among the plurality of optical scanning parts;
calculating an offset value for a light-scan of an other optical scanning part among the plurality of optical scanning parts from the horizontal synchronization signal applied to the any one optical scanning part; and
scanning the photoconductor with the plurality of optical scanning parts with the light of plural colors according to the calculated offset value,
wherein the calculating the offset value comprises calculating the offset value if the horizontal synchronization signal corresponding to the any one optical scanning part is applied in an effective image interval in which the other optical scanning part scans the photoconductor with the light.

16. The signal synchronizing method according to claim 15, wherein the calculating the offset value comprises generating a video clock corresponding to the other optical scanning part.

17. The signal synchronizing method according to claim 15, wherein the calculating the offset value comprises storing the calculated offset value.

18. A synchronizing method for an image forming apparatus including a processor, the method comprising:
applying a synchronization signal to any one of a plurality of optical scanning parts corresponding to a plurality of colors respectively of the image forming apparatus;
calculating, with the processor, respective offset values to be applied to each of the other ones of the plurality of optical scanning parts; and
scanning according to the calculated values,
wherein the calculating respective offset value comprises calculating the offset value if the horizontal synchronization signal corresponding to the any one optical scanning part is applied in an effective image interval in which the other optical scanning part scans the photoconductor with the light.

* * * * *

UNITED STATES PATENT AND TRADEMARK OFFICE
CERTIFICATE OF CORRECTION

| | | |
|---|---|---|
| PATENT NO. | : 8,072,477 B2 | Page 1 of 1 |
| APPLICATION NO. | : 11/839847 | |
| DATED | : December 6, 2011 | |
| INVENTOR(S) | : Kwon-cheol Lee | |

It is certified that error appears in the above-identified patent and that said Letters Patent is hereby corrected as shown below:

Column 6, Line 46, In Claim 1, delete "of plurality" and insert -- of a plurality --, therefor.

Signed and Sealed this
Twenty-second Day of May, 2012

David J. Kappos
*Director of the United States Patent and Trademark Office*